S. B. CHRISTENSEN.
PLANTER.
APPLICATION FILED JAN. 7, 1915.
1,177,092.
Patented Mar. 28, 1916.
2 SHEETS—SHEET 2.
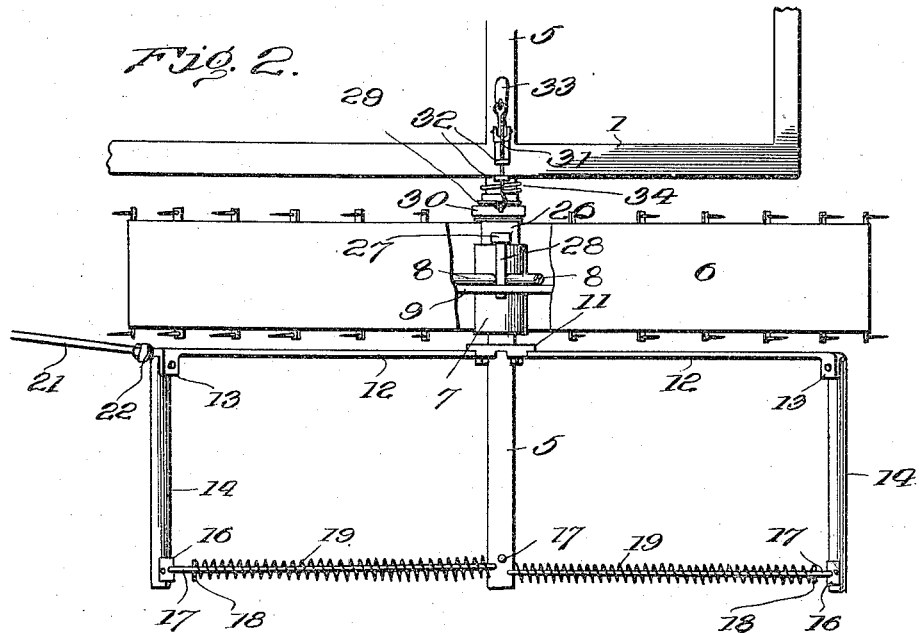
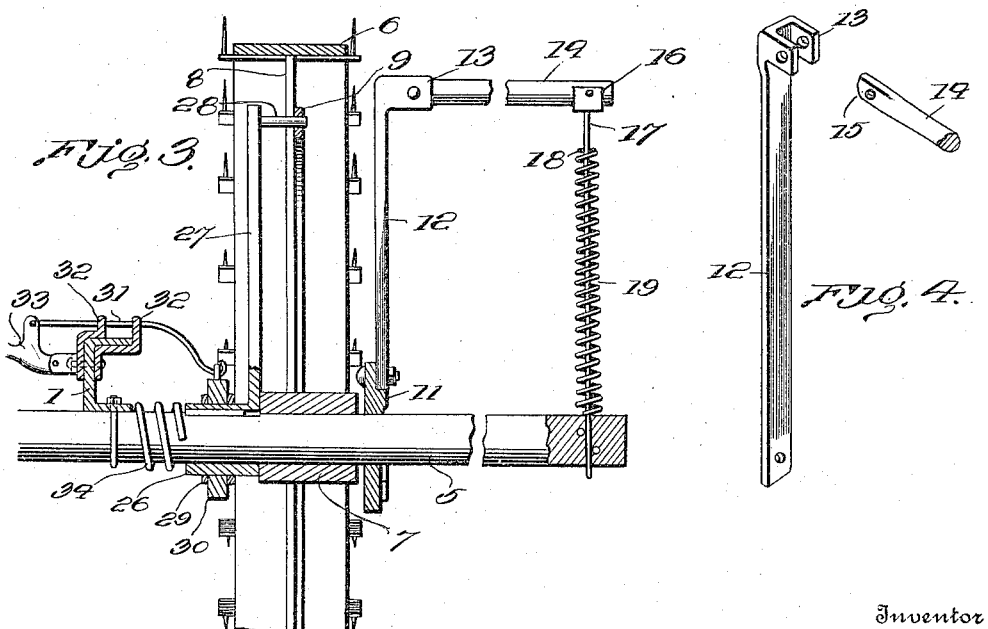
Witnesses
Inventor
S. B. Christensen
By
Attorneys

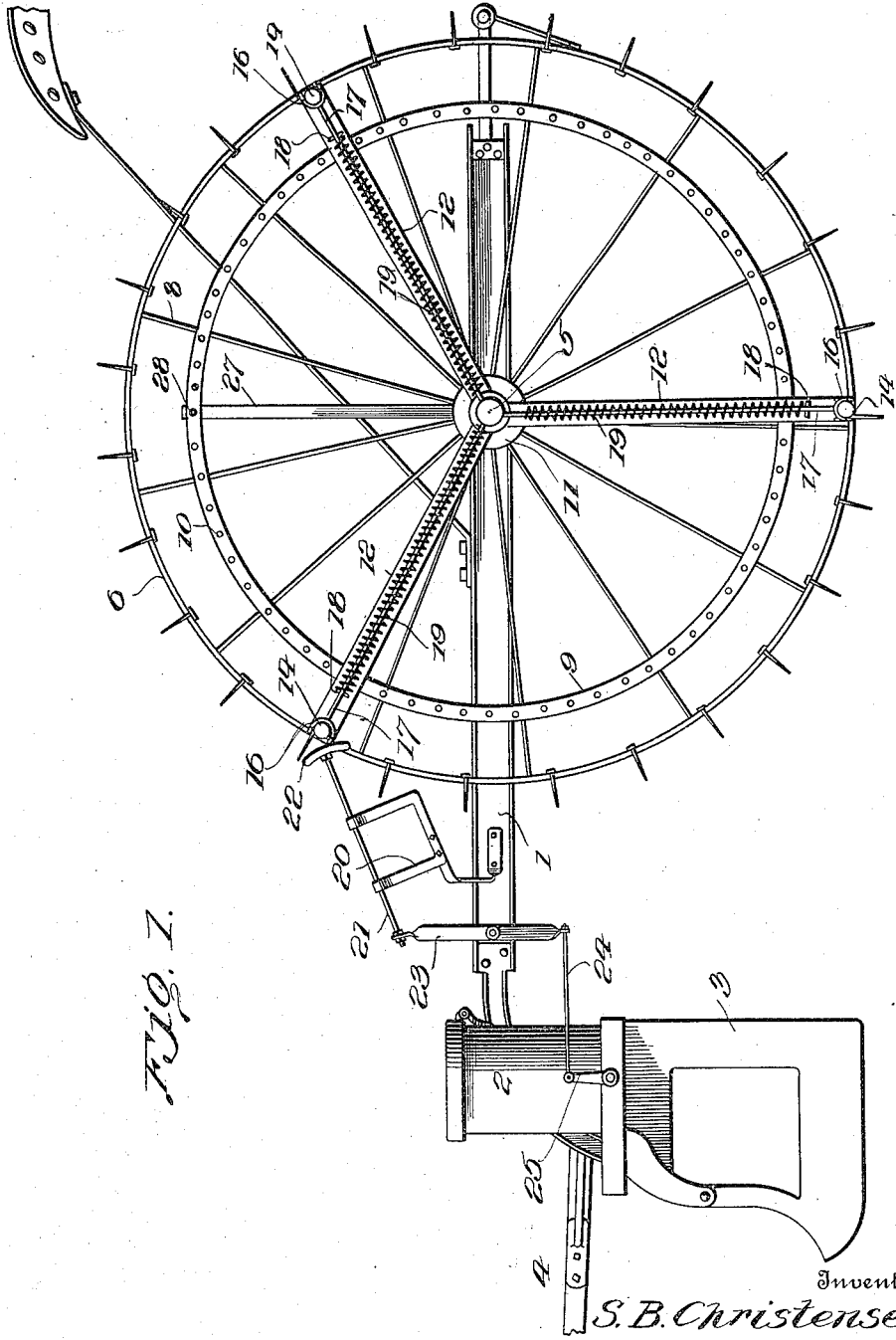

UNITED STATES PATENT OFFICE.

SIGURD B. CHRISTENSEN, OF GRANVILLE, IOWA.

PLANTER.

1,177,092.  Specification of Letters Patent.  Patented Mar. 28, 1916.

Application filed January 7, 1915. Serial No. 1,012.

*To all whom it may concern:*

Be it known that I, SIGURD B. CHRISTENSEN, a citizen of the United States, residing at Granville, in the county of Sioux and State of Iowa, have invented certain new and useful Improvements in Planters, of which the following is a specification.

This invention relates to planters of the type disclosed in Letters-Patent, No. 1,092,241, granted to me April 7th, 1914, and one object of the present invention is to improve the construction of the marker so that it may ride over stones or other unyielding obstructions encountered in the travel of the machine over the field.

A further object of the invention is to simplify the construction of the parts in order that they may be more compactly arranged, and a still further object of the invention is to provide an improved timer for the marker.

These several stated objects, and other objects which will incidentally appear as the description of the invention proceeds, are attained in the mechanism illustrated in the accompanying drawings.

The invention resides in certain novel features which will be particularly pointed out in the claims following the description.

In the accompanying drawings: Figure 1 is a side elevation of so much of a planter as is necessary to disclose my present improvements; Fig. 2 is a plan view of the same; Fig. 3 is a vertical section taken in the axial plane of a ground wheel; and Fig. 4 is a detail perspective view of parts of the marker.

The frame, indicated at 1, may be of any convenient or preferred construction, and the seed hopper 2 is mounted at the front end of the frame and carried by runners 3 in the usual manner, a draft pole or tongue 4 being connected with the frame, as will be readily understood. An axle or driving shaft 5 is mounted in suitable bearings upon the main frame, and the ground wheels 6 (one of which is shown in the drawings) are revolubly mounted upon the axle.

The ground wheel illustrated is constructed with a hub 7 fitting loosely upon the axle, spokes 8 extending from the said hub to the periphery or tread of the wheel, as will be readily understood. A ring 9 is secured to the spokes concentric with the hub, and the said ring is constructed with openings 10 extending throughout the same and the purpose of which will presently appear. Adjacent the outer end of the hub 7, I secure to the axle in any desired manner a disk or hub plate 11 to which are secured the inner ends of radial arms 12 which are constructed at their outer ends with perforated lugs or ears 13 projecting away from the ground wheel approximately parallel with the axle. Between the said lugs or ears 13, I pivotally secure the inner ends of marking bars 14, the said inner ends of said bars being rounded or made convex upon one side, as shown at 15, so that the said bars may swing upon their pivots toward the axle but will be prevented from swinging outwardly from the axle by engaging against the surface of the radial arms 12, as will be readily understood. To the outer extremities of the said marking bars 14, I pivot U-shaped plates or clips 16 from which guiding and supporting rods 17 extend inwardly to the axle, the inner ends of said rods passing radially through the axle, as clearly shown in Fig. 3. Between the axle and a pin or other stop 18 upon each of said rods, a spring 19 is coiled around the rod so as to yieldably hold the rod and the marker bar in operative position, as illustrated in the drawings.

It will be readily understood that, if during the travel of the machine, the marker bar should strike a stone or other unyielding substance, the marker bar will swing inwardly upon its pivot and compress the spring, which will at once expand when the obstruction has been passed and return the bar to its normal operative position. Three of these marker bars and their coöperating parts are shown in the present drawings, but it will be understood, of course, that a greater or less number may be employed provided, always, the distance between the markers is equal to the distance between the hills.

A bracket 20 is secured upon the main frame in advance of the ground wheel, and a reciprocating rod 21 is slidably mounted in said bracket, the rear end of the said rod being equipped with a shoe 22 which lies normally in the path of the marker bars, and the front end of the said rod being attached to the upper end of a lever or vibratory arm 23 which is pivotally mounted upon the main frame. The lower end of this lever or vibratory arm 23 is connected by a link 24 to a crank arm 25 upon a rock shaft which is disposed below the hoppers and adapted to actuate the seed dropping mechanism in the usual manner. It will thus be seen that, as the axle is rotated and the marker bars caused to travel, the several marker bars will successively impinge upon the shoe 22 and actuate the rod 21 so as to oscillate the rock shaft 25 and thereby drop the seed at regular intervals. The marker bars will simultaneously make imprints upon the ground at similar intervals so as to mark the hills where the seed has been planted.

Adjacent the inner end of the hub 7, I mount upon the axle a combined clutch member and timer, consisting of a sleeve 26 which is splined upon the axle so as to be slidable thereon but constrained to rotate therewith, and a radial arm 27 extending from the outer end of the said sleeve and equipped at its outer extremity with a pin or other projection 28 adapted to enter one of the openings 10 in the ring 9. The sleeve 26 is constructed with an annular groove or spaced annular ribs 29 between which is engaged a fork or yoke 30 to the upper end of which is attached a sliding bar or link 31 extending inwardly through guides 32 on the main frame and pivoted to a lever 33 which is fulcrumed upon the inner side of the main frame, as shown and as will be readily understood.

It is thought the operation will be readily understood from the foregoing description, taken in connection with the accompanying drawings. When the machine is in use, the lever 33 is swung upwardly so as to permit the pin 28 to engage an opening in the ring 9 under the influence of a spring 34 coiled around the axle between the main frame and the inner end of the sleeve 26. The said ring and the ground wheel will thus be locked to the axle so that, as the ground wheel rotates, the axle will be also rotated, and the marker bars which are carried by the axle caused to rotate with the axle, thereby actuating the seed dropping mechanism and marking the hills as previously stated.

Should it be desired to move the machine from one field to another, or to back the same without operating the seed dropping mechanism, the lever 33 is depressed thereby causing the sleeve 26 to slide inwardly upon the axle against the tension of the spring 34 and withdraw the arm 27 with its pin 28 from engagement with the ring 9. The ground wheel then will be free to rotate about the axle without imparting movement thereto. Should it be found that the marker arms are not in position to make an imprint upon the ground at the end of the field when the planting operation is to be started, the axle may be rotated within the hub of the ground wheel by merely grasping the timer arm 27 and rotating the same until one of the marker bars reaches the lowest point of the tread of the ground wheel, which position is illustrated in Fig. 1. The sleeve 26 of the combined timer and clutch member will rotate within the yoke or fork 30 so that no binding of the parts may occur, and the marker may thus be readily brought into the proper position to perform the desired operation. When the marker has been brought into its operative position, the lever 33 is released and the spring 34 then at once expands and moves the timer and clutch member into engagement with the member 9 so as to lock the same and the ground wheel to the axle. It will be readily understood, of course, that, when the machine is to be moved over a road without operating the seed dropping mechanism, the axle is rotated so as to bring the marker arms into a position in which no marker bar will be in engagement with the ground, and the timer and clutch member 27 is then withdrawn from its engagement with the member 9 and held out of such engagement by retaining the pressure upon the lever 33 until the machine has reached the desired place.

It will be readily noted that the improved mechanism herein disclosed simplifies the construction and arrangement so as to provide a more compact mechanism and reduce the cost of production. The outer ends of the marker bars will be supported with sufficient firmness to make a visible imprint upon the ground, while, at the same time, they are so mounted and arranged that they may yield without breakage to any stones or other hard obstructions encountered during the travel of the machine.

Having thus described the invention, what is claimed as new is:—

1. The combination of an axle, a ground wheel loosely mounted upon the axle, a ring secured to the ground wheel between and concentric with the periphery of the wheel and the axle and provided with openings throughout its extent, a marker carried by the axle, a timer arm slidably mounted on the axle and adapted at its outer end to engage one of the openings in the ring, and means connected with the inner end of said timer arm to move said arm into and out of engagement with the said opening.

2. The combination of a frame, an axle, a ground wheel loosely mounted on the axle, a ring secured to the ground wheel concentric with the axle and provided with a series of openings, a timer arm disposed radially of the ground wheel at the inner side thereof and provided at its outer end with a lateral pin adapted to engage one of the openings in said ring, a sleeve connected to the inner end of said timer arm and slidably mounted upon the axle but constrained to rotate therewith, a spring coiled around the axle between the frame and the inner end of said sleeve, a yoke engaging said sleeve, a lever mounted on the frame at the inner side thereof, a link connecting said lever with said yoke and slidably mounted transversely on the frame, and a marker carried by the outer end of the axle.

In testimony whereof I affix my signature in presence of two witnesses.

SIGURD B. CHRISTENSEN. [L. S.]

Witnesses:
 JOHN VONDERHARR,
 HENRY J. RICKER.

Copies of this patent may be obtained for five cents each, by addressing the "Commissioner of Patents, Washington, D. C."